April 14, 1936.  L. L. BELTZ  2,037,058
MOTOR VEHICLE
Filed April 9, 1934
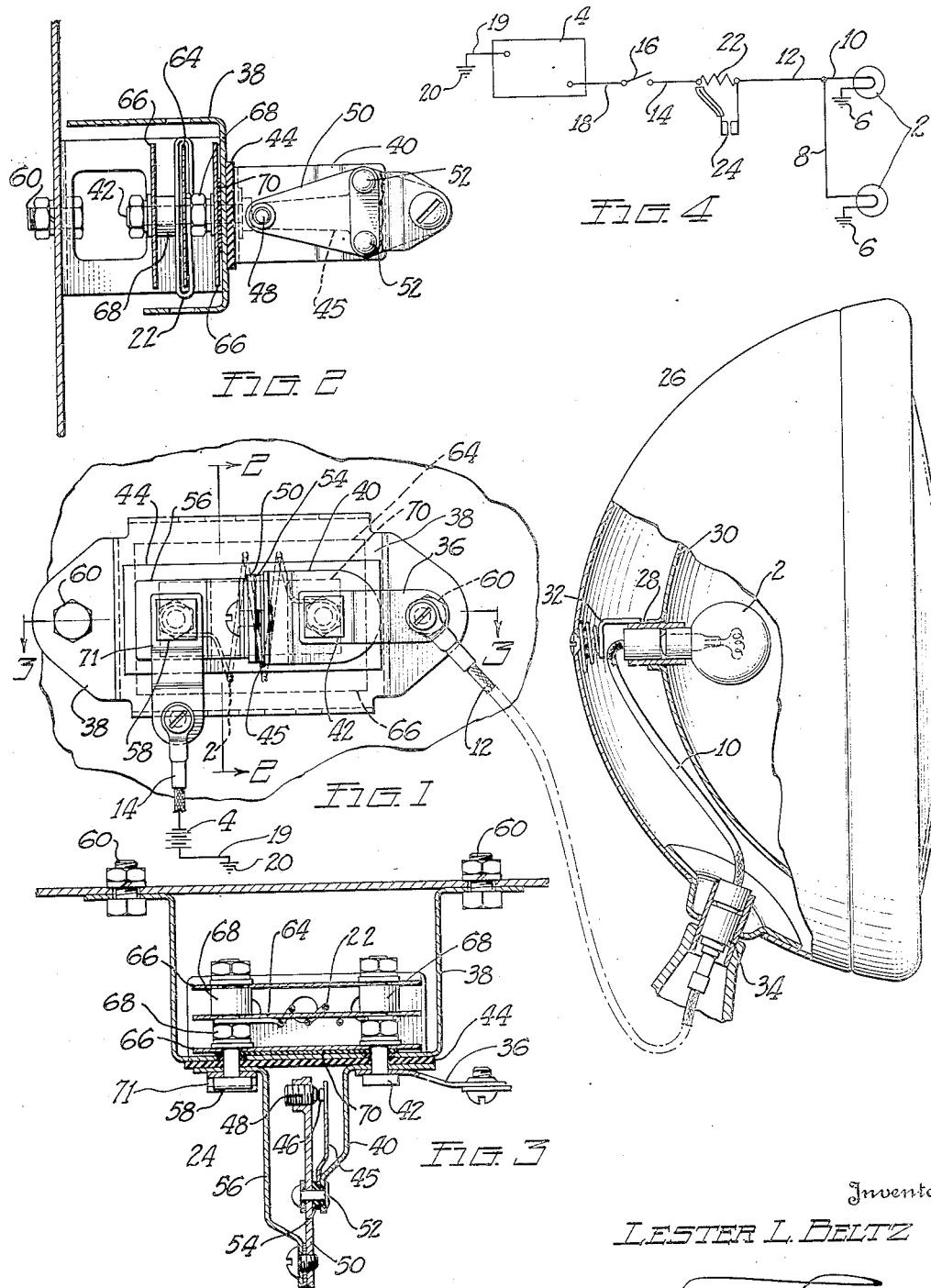
Inventor
LESTER L. BELTZ
By Milton Tibbitts
Attorney Patented Apr. 14, 1936

2,037,058

UNITED STATES PATENT OFFICE 2,037,058

MOTOR VEHICLE

Lester L. Beltz, Detroit, Mich., assignor to Packard Motor Car Company, Detroit, Mich., a corporation of Michigan Application April 9, 1934, Serial No. 719,642

3 Claims. (Cl. 171—97)

This invention relates to motor vehicles and more particularly to lighting systems for such vehicles.

In one system employed for lighting motor vehicles, a fuse has been inserted in the light circuit and a relatively high resistance has been connected in said circuit in parallel with said fuse. With this construction, when the fuse blows out on account of a dangerously heavy current flowing through the light circuit such as might be caused by a short circuit, the light circuit will be maintained through the high resistance and the lamps will give a dim light to enable the driver to reach a garage.

With such a system, drivers often do not recognize the dimming of the lights as an indication of trouble or disregard the same and motor vehicles are frequently driven for a considerable time having the dimmed lights as the only illumination with the consequent dangers.

In another system which has been employed, a thermostatically controlled switch has been inserted in the light circuit. This switch, when a dangerously heavy current flows through the circuit, will automatically break and make the circuit intermittently thereby causing a flashing of the lights and giving an unmistakable indication of trouble. When the action of the switch breaks the circuit, however, the lights are completely off and the driver will be unable to drive the car to a garage.

One object of the present invention is to provide a motor vehicle with a lightining system in which an unmistakable indication of trouble will be given when a dangerously heavy current flows through the circuit and at the same time sufficient light will constantly be given by the lamps to enable the operator safely to drive the vehicle.

Another object of the invention is to produce a lighting system for motor vehicles which will have the advantages and avoid the disadvantages of the systems above briefly described.

Another object of the invention is to produce a lighting system for motor vehicles in which the lamps will give an intermittent flashing signal when an abnormally heavy current flows through the lighting circuit and a dim light between the flashes.

With the above and other objects in view the invention consists in a lighting system embodying the novel and improved features hereinafter described and particularly pointed out in the claims, the advantages of which will be readily understood by those skilled in the art.

The invention will be clearly understood from the accompanying drawing illustrating a lighting system embodying the invention in its preferred form and the following detailed description of the constructions therein shown.

In the drawing Fig. 1 is a view partly in elevation and partly in section illustrating a lighting system embodying the invention.

Fig. 2 is a detail view in vertical section illustrating particularly the resistance and thermostatic switch unit and taken substantially on the line 2—2 of Fig. 1.

Fig. 3 is a detail view in horizontal section taken substantially on the line 3—3 of Fig. 1, and Fig. 4 is a diagrammatic view illustrating the circuit connections for the system.

In the form of the invention illustrated in the drawing the lighting system comprises a series of lamps indicated at 2, a battery indicated at 4, and circuit connections for supplying current to the lamps from the battery. Various arrangements of the circuit connections may be employed. In the particular arrangement shown in the drawing, each of the lamps is provided with a ground connection indicated at 6. The lamps are connected in parallel by means of conductors 8 and 10. The circuit connections also comprise a conductor 12 for connecting the lamps with thermostatic switch and resistance elements, a conductor 14 for connecting these elements with a manually operable switch 16, and a conductor 18 for connecting said switch with the battery 4. The battery is connected by a conductor 19 with a ground 20.

The thermostatic switch and resistance elements are provided in the circuit for connecting the lamps with the battery in order to cause a flashing signal to be given when a dangerously heavy current passes through the lighting circuit and also to cause the lamps to give a dim light during the intervals between the flashes so that the driver can see to drive the car to a garage or other destination. To secure these results the system comprises a relatively heavy resistance 22 and a thermostatic switch 24 introduced into the lighting circuit and connected in parallel with each other.

Referring particularly to Figs. 1, 2, and 3, the lamp 2 of the headlight or other light 26 of the vehicle is mounted in a socket 28 set in the inside wall 30 of the light casing and is grounded through said casing by the connection indicated at 32 in the usual manner. The lamp is connected by conductor 10 with a plug 34 supported in the light casing, which in turn is connected by a conductor 12 with a connector plate 36 supported on the casing 38 of the thermostatic switch and resistance unit. This plate engages an angular support 40 and both support and plate are secured to the casing 38 by means of a bolt 42, an insulating plate 44 being interposed between the support 40 and the casing. To the outer end of the support 40 is secured a thermostatic switch element 45 having at its free end a contact 46 arranged to engage a contact 48 carried by a plate 50 secured to the plate 40. The switch element 45 and the plate 50 are secured to the outer end of the support 40 by means of one or more rivets 52, the switch element being insulated from said plate by means of an insulating member 54 which also insulates the rivets 52 from the plate 40 and element 45. The outer end of the plate 50 is secured to an angular support 56 attached to the casing 38 by means of a bolt 58 and insulated from the casing by means of the insulating plate 44.

The casing 38 is attached in any suitable position to the frame of the motor vehicle by means of bolts 60.

The bolts 42 and 58 are connected within the casing 38 by means of a conductor 22 preferably consisting of wire arranged to furnish a relatively heavy resistance to the passage of the current therethrough. In the construction shown this wire is wound in several coils about a plate 64 consisting of mica or other suitable non-conducting material able to withstand the high temperatures induced in the conductor 22. Upon opposite sides of the conductor 22 and the supporting plate 64 are mounted shields 66 preferably consisting of poor conductors of heat such as mica plates. These plates are spaced from the plate 64 and the conductor 22 by means of spacing devices 68 and the plate 66 adjacent the outer wall of the casing is spaced therefrom by means of a spacing plate 70 of insulating material.

To the head end of the bolt 58 is attached a connector plate 71 and to this plate is connected the conductor 14 leading to the battery.

The switch element 45 is flexible and has the usual bimetallic construction and is arranged so that upon the heating of this element above a certain temperature the element will bend sufficiently to disengage the contact 46 from the contact 48 and thereby break the main part of the circuit for the lamps 2.

When the lighting system is in operation the switch 16 is closed. During the normal operation of the system the contact 46 is in engagement with the contact 48. The main part of the current for the lamps then flows through the thermostatic switch, a relatively small part of the current flowing through the resistance 22. During the flowing of the normal current through the thermostatic switch the switch element 45 is not heated sufficiently to open the switch. When a dangerously heavy current passes through the lighting circuit such as is produced upon the occurrence of a short circuit, the heat developed in the switch element 45 causes the same to bend to disengage the contact 46 from the contact 48 thereby breaking the main part of the lighting circuit. The circuit, however, is maintained through the resistance 22. This resistance cuts down the current flowing through the lighting circuit so that the lamps 2 give only a dim light.

Immediately after the breaking of the main part of the light circuit by the thermostatic switch, the switch element 45 begins to cool and the cooling of said element causes the same to bend in the opposite direction until the contact 46 is again engaged with the contact 48 thereby connecting again the main part of the lighting circuit.

This making and breaking of the main part of the lighting circuit will be repeated until the trouble is located and the required repairs made. During the entire period that the trouble continues a flashing signal will be given by the lamps 2 and during the periods between the flashes the lamps will give a dim light sufficient to enable the driver to drive the vehicle.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A motor vehicle lighting system comprising head lamps, an electric circuit connected with said lamps having a heavy resistance element incorporated therein, said element being effective to transmit sufficient current to dimly light said lamps and having a capacity sufficient to prevent fire when the circuit is shorted, and means including a thermostatic switch element connected in said circuit in a relation bridging said resistance element, said bridging means transmitting sufficient current to brightly light said lamps and said switch element being effective to periodically break the current passing through said bridging means when said circuit is shorted.

2. A motor vehicle lighting system comprising head lamps, an electric circuit connected with said lamps having heavy resistance means incorporated therein, said means being effective to transmit sufficient current to dimly light said lamps and having a capacity sufficient to prevent fire when the circuit is shorted, and means connected in said circuit in a relation bridging said resistance means and transmitting sufficient current to brightly light said lamps, said bridging means including an element automatically movable to periodically break the bright light circuit when there is a short in the system.

3. A motor vehicle lighting system comprising head lamps, an electric circuit connected with said lamps having a heavy resistance means incorporated therein, said means being effective to transmit sufficient current to dimly light said lamps and having a capacity sufficient to prevent fire when the circuit is shorted, a switch in said circuit, and means connected in said circuit bridging said resistance means and effective to transmit sufficient current to brightly light said lamps, said bridging means having a thermostatic switch element therein movable to periodically break the current passing through said bridging means when such circuit is shorted and the control switch is in effective position.

LESTER L. BELTZ.